May 18, 1965 A. ROLON 3,184,230
DOCUMENT FEEDING
Filed Oct. 2, 1962 2 Sheets-Sheet 1
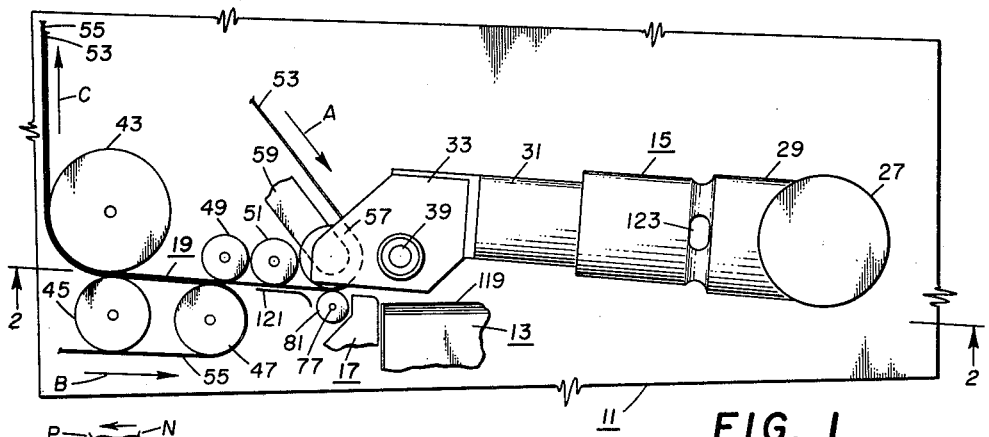
FIG. 1
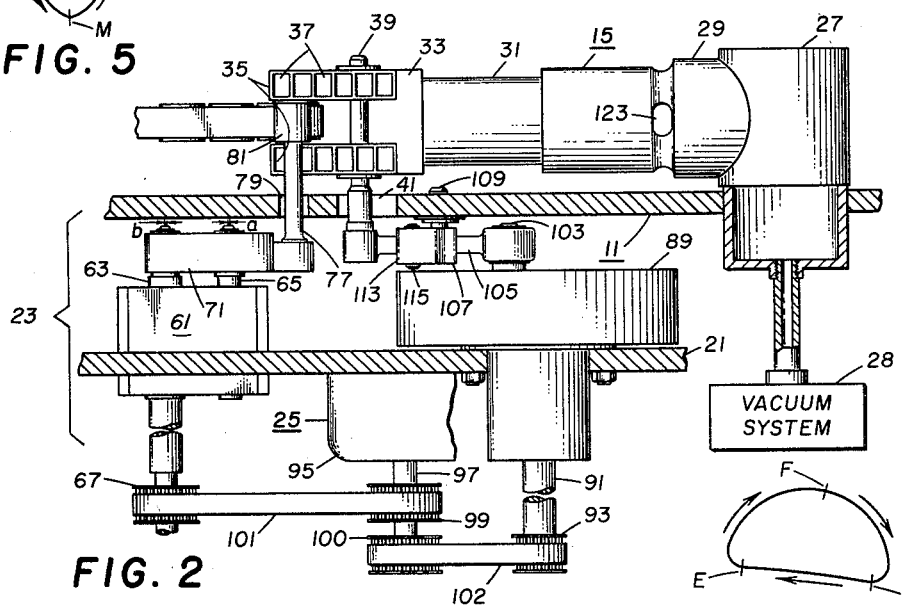
FIG. 5
FIG. 2
FIG. 4
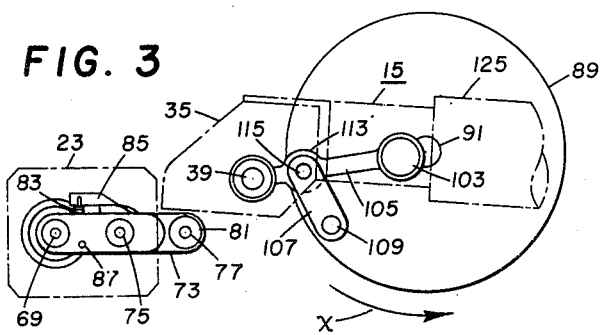
FIG. 3
ARNALDO ROLON
INVENTOR.
BY
ATTORNEY May 18, 1965 A. ROLON 3,184,230
DOCUMENT FEEDING
Filed Oct. 2, 1962 2 Sheets-Sheet 2
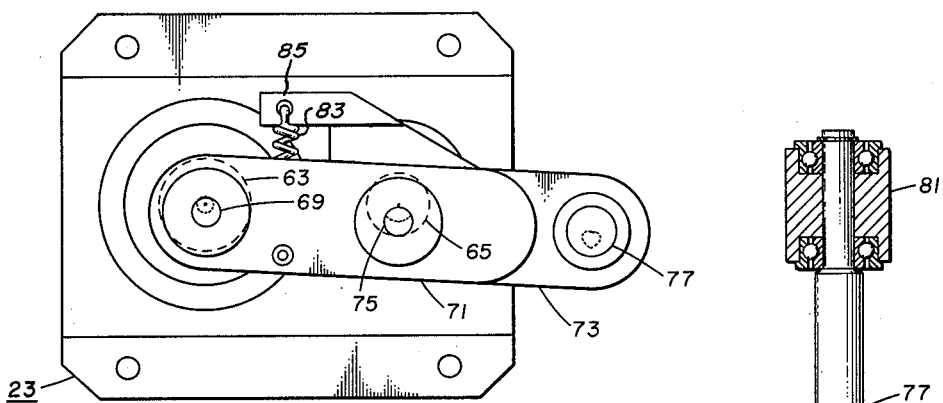
FIG. 7
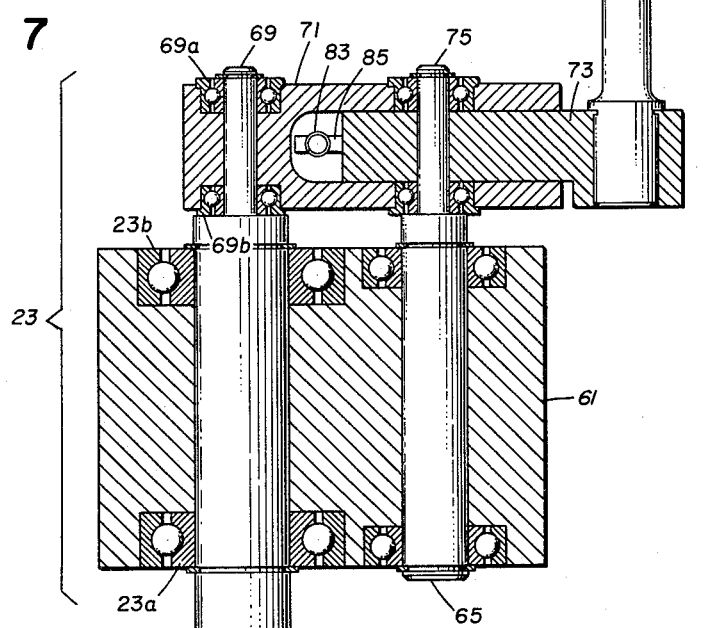
FIG. 6
ARNALDO ROLON
INVENTOR.
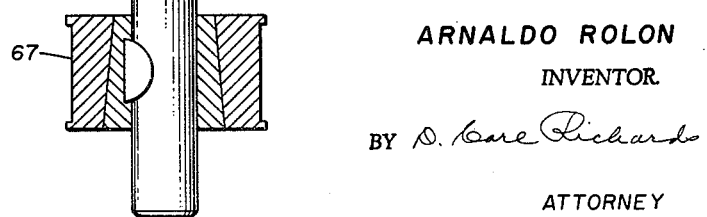
ATTORNEY United States Patent Office 3,184,230
Patented May 18, 1965

3,184,230
DOCUMENT FEEDING
Arnaldo Rolon, Irving, Tex., assignor to Sperry Rand Corporation, New York, N.Y., a corporation of Delaware
Filed Oct. 2, 1962, Ser. No. 227,914
10 Claims. (Cl. 271—11)

This invention relates to material handling and more particularly to a mechanism for transporting, one at a time, thin sheets of material such as paper documents from a stack thereof into a document conveyor system.

Modern business methods, especially as employed in banking, include the handling and sorting each day of enormous quantities of documents such as checks. Machines which presently perform the work of handling and sorting checks are beset with many difficulties resulting from the requirement to function at a high rate of speed. Some machines jam and clog up because they remove "doubles," rather than only one check at a time. Other presently known machines malfunction because the removing, transporting and feeding sequence is not properly synchronized. Documents are bent, torn or otherwise damaged before entering the conveyor system causing it to clog up and jam. It is essential that the machine remove only one check at a time and that it be transported and fed into a document conveyor system without damage to the check.

In contrast to such prior art apparatus and systems, the present invention relates to a mechanism comprising a document feeder and a timing cam which cooperate effectively to remove only one check at a time from a stack thereof, transport same and feed only the one check in undamaged condition into a document conveyor system.

It is an object of the present invention to provide an improved document handling apparatus.

Another object of the present invention is to provide an improved apparatus for removing from a stack only on thin sheet of material at a time and for transporting and feeding such single sheet of material into a material conveyor system.

Another object of the present invention is to provide improved apparatus that will remove, at a high rate of speed, a single document from a stack thereof, transport, and feed the same into a conveyor system.

A further object of the present invention is to provide improved apparatus that will cyclically remove, transport and feed documents serially into a conveyor system at a high rate of speed with a minimum of damage to the documents.

In accordance with the present invention, there is provided a document engaging member which is driven in a closed path, a segment of which is substantially linear and tangent to the path of travel of a document in a conveyor system. A pair of belts in the system are provided, one extending beyond the other toward the document engaging mechanism. An idler member positioned adjacent the extension of the one belt is driven in a closed path, a portion of which is substantially linear and tangent the path for engaging a document moved into confronting relation to said belt. Drive means is provided for both said engaging member and said idler for driving said idler into tangency as the engaging member is moved out of tangency.

Preferably, the idler member is supported by a pair of spaced apart shafts each having a stub shaft eccentrically mounted thereon. A pair of links are commonly pivoted on one stub shaft. The free end of one link is pivoted on the other stub shaft and the free end of the other link is connected to one end of a pivotal support on which the idler is mounted. The idler preferably is positioned adjacent a transport element of a document conveyor system for translational rotational movement along a trajectory in a horizontal plane.

There is provided, moreover, a document feeder arm which moves in a trajectory in the same horizontal plane. In the course of such trajectory, the arm moves from a point of beginning and approaches closely the surface of a first document or check at the front of a stack thereof. A slight vacuum is maintained in the arm. The check is pressed against the end of the arm and is removed from the stack. Subsequently, in the course of its trajectory, the arm transports the check toward a point of entry into the document conveyor system and the vacuum is broken. The check is released from the feeder and at the same instant the idler urges the check into the conveyor system. Thereafter, the arm returns to its point of beginning, and the idler to its point of beginning.

For a more complete understanding of the present invention and for further objects and advantages thereof, reference may now be had to the following description, taken in conjunction with the accompanying drawings in which:

FIGURE 1 is a fragmentary plan view of a document handling mechanism in accordance with a preferred embodiment of the present invention;

FIGURE 2 is a fragmentary elevational view, taken along line 2—2 of FIGURE 1;

FIGURE 3 is a schematic plan view of the actuating linkage of the feeder and roller cam;

FIGURE 4 is a schematic diagram of the trajectory of the feeder actuating rod;

FIGURE 5 is a schematic diagram of the trajectory of the cam roller shaft;

FIGURE 6 is an enlarged sectional elevational view of the timing cam mechanism; and FIGURE 7 is a schematic top view of the mechanism of FIGURE 6.

Referring to FIGURE 1, there is provided a support or base plate 11 on the top surface of which there is mounted a tray, or other suitable device, in which there is arranged a stack of documents 13. A feeder device 15, a vacuum chamber 17, and a portion of a document conveyor system 19 are also mounted on plate 11.

Below the base plate 11, in spaced parallel relation thereto, there is provided another support plate 21. Mounted on plate 21 is a timing cam unit 23 and a driving mechanism 25 for actuating both the feeder 15 and the cam unit 23.

The feeder 15 comprises a cylindrical tube 27 which is mounted on the base plate 11 for oscillatory movement relative to a vertical axis. Another cylindrical arm or tube 29 pierces the wall of the tube 27 and is supported thereon with its axis substantially perpendicular to the axis of the cylinder 27. The tube 27 extends below the plate 11 and is connected to a vacuum system 28, by means of which a slight vacuum is produced in the feeder 15. The feeder arm includes a tube 31 which is adapted to telescopically reciprocate within the tube 29. Tube 31 is connected to one end of a hollow bifurcated structure 33 having a pair of control fingers 35. Each of fingers 35 of the structure 33 is provided with a plurality of rectangularly shaped openings 37 arranged, as seen in FIGURE 2, in spaced parallel relation. Structure 33 is journally connected to the end of an actuating rod 39 which projects through a slot 41 in the base plate 11. The lower end of the rod 39 is connected to a linkage of the actuating mechanism 25 located beneath the base plate 11, best seen in FIGURE 3.

The fragmentary portion of the conveyor system 19, which is shown in FIGURE 1, includes a plurality of rollers 43, 45, 47, 49 and 51 of various sizes, a pair of movable tapes or endless belts 53, 55, and an entry roller 57. The rollers 43 to 51 inclusive are journaled to rotate on shafts which are fixedly mounted in a vertical position on the upper surface of the base plate 11. The roller 57 is mounted at one end of an arm 59 for rotation about a vertical axis. The arm 59 is adjustably fixed to the base 11 and is so disposed that the fingers 35 will straddle it. The endless belt 53 approaches the roller 57 along the direction of the arrow A. From roller 57, the belt 53 travels toward the left, as viewed in FIGURE 1. The second belt 55 approaches the roller 47 along the direction of the arrow B, then travels toward the left, as viewed in FIGURE 1. Thus belts 53, 55 are in contact in the region between the rollers 47, 49. They travel together around the roller 43 and upward in the direction of the arrow C, FIGURE 1. It is to be understood that the belts 53, 55 are guided by other rollers (not shown), some of which are powered, to lead to a selected destination in the document conveyor system.

The timing cam unit 23 includes a rectangular body 61, which is fixedly mounted on the plate 21. A pair of spaced parallel vertical shafts 63, 65 are suitably journaled in the body 61. Both of the shafts 63, 65 extend above the body 61, but only the shaft 63 projects below the body 61. On the lower end of shaft 63 is mounted a flanged timing pulley 67. The upper end of the shaft 63 is provided with an extension or stub shaft 69, of smaller diameter, which is eccentric to the axis of the shaft 63. Journaled on the shaft 69 is one end of a link 71 which is disposed in a horizontal plane substantially perpendicular to the axis of the shaft 63. The link 71 is made in the form of a clevis, between the jaws of which there is another link or arm 73. The arm 73 and the clevis of link 71 have a common pivot pin which is an extension or stub shaft 75 and which is eccentrically connected to the upper end of the shaft 65. The free end of the arm 73 is bored to fixedly receive one end of a vertical shaft 77, which extends upward through an elongated opening 79 in the base 11. An idler roller 81 is suitably journaled on the upper end of the shaft 77 for rotation about the axis of the shaft 77. Also provided is a spring 83 which is connected to one end of a lever 85 and to a vertical pin 87 depending from the upper jaw of the clevis. The lever 85 is an extension of the arm 73.

The system thus far described includes a vacuum operated feeder arm for the documents in the stack 13. As will hereinafter be described, the vacuum gripping fingers 35 serve to pick a document from a stack and move it toward a point of insertion between the belts 53 and 55. At the end of the traverse of the fingers 35, the vacuum is released. Simultaneously therewith the idler roller 81 is moved into contact with the face of the document opposite the fingers 35, and urges the document into contact with the belt 53. Thereupon, the frictional force between the document and belt 53, developed by pressure from the idler roller 81, causes the document to be injected between the belts as they pass over pulleys 47 and 49.

The mechanism 25 actuates both the feeder 15, which carries the fingers 35, and the idler roller 81, which will now be described in more detail. The driving system includes linkages driven by a motor 95. More particularly, a flywheel 89 is journally mounted for rotation on a shaft 91 projecting above the plate 21. The shaft 91, projects below the plate 21 and there is mounted on the lower end a flange pulley 93. The pulley is suitably secured to the dependent shaft 91 by a key, or it may be secured thereon in any other suitable manner. The electric motor 95 is mounted to the plate 21 and has a vertically depending shaft 97 to which is suitably fixed a pair of flanged drive pulleys 99, 100. A toothed timing belt 101 couples the pulley 67 to pulley 99. Similarly, a belt 102 couples pulley 93 to pulley 100. Thus, the motor 95 synchronously drives shafts 63 and 91. A vertical stub shaft or crank arm 103 is mounted in the top of the flywheel 89, with its axis parallel and eccentric to the axis of the shaft 91. Journaled on the stub shaft 103 is one end of a rigid link 105, which is a part of the feeder actuating mechanism 25. The linkage of the feeder actuating mechanism may be observed in FIGURES 2 and 3. One end of a short rigid link 107 is pivotally secured to the base plate 11 by a pin 109. The other end is pivotally coupled to an intermediate point on the link 105. The other end of the link 105 is journaled to shaft 39. The vertical rod 39 is journally mounted in the structure 33 of arm 15.

It will aid materially in understanding the operation of the mechanism to consider first the relative motion of the feeder 15 and the roller 81, since both are actuated simultaneously and synchronously by the motor 95 through belts 101, 102.

The shaft 39, and therefore the fingers 35, describe a trajectory which is shown, at an enlarged scale, in FIGURE 4.

More particularly, the arm 15 pivots about the axis of the vertical tube 27. The link 107 pivots about a fixed point 109. The end of the arm 105 is driven eccentrically by the shaft 103. When the flywheel 89 rotates in the direction of arrow X, the fingers 35 follow the D-shaped trajectory of FIGURE 4. More particularly, as shown in FIGURE 3, the shaft 103, moving counterclockwise, rotates the linkage 107 in a clockwise direction, thus raising the fingers 35. This action is the motion illustrated in FIGURE 4. Beginning at E, as the shaft 103 travels in its eccentric path to a point diametrically opposite the point shown in FIGURE 3, the fingers 35 traverse the trajectory passing through the point F (FIGURE 4) and arrive at point D (FIGURE 4). The section of the trajectory of FIGURE 4 between points D and E represents the movement imparted to fingers 35 during the first half-cycle of the shaft 103.

The shaft 77 drives the idler roller 81 in a trajectory which is shown, in an enlarged scale, in FIGURE 5. More particularly, as shown in FIGURES 6 and 7, the shaft 63, driven by pulley 67, is journaled in bearings 23a and 23b for rotation about the axes thereof. The link 71 is mounted on bearings 69a and 69b which in turn are supported by the stub shaft 69 which extends from and is a part of the shaft 63. However, as above noted, the shaft 69 is eccentric with respect to the shaft 63. Thus, as the shaft 63 is driven, the axis of stub shaft 69 traverses a small circle. Stub shaft 75, extending from shaft 65, is commonly journaled in the clevis of the link 71 and the arm 73. The stub shaft 75 is eccentric to the shaft 65, the eccentricity being at least as great as and, preferably, greater than the eccentricity of the stub shaft 69 relative to shaft 63. Thus, as the stub shaft 69 travels in a circular path, the axis of stub shaft 75 oscillates in an arcuate path. The shaft 77 and the supporting arm 73 are driven by the clevis of the link 71 and, therefore, the roller 81 is caused to follow the trajectory of FIGURE 5.

In the enlarged view of FIGURE 7, the trajectories of the axes of stub shafts 69 and 75 are indicated, as is the trajectory of the axis of the idler shaft 77.

The linkage leading to the idler 81 and the linkage leading to the fingers 35 are so synchronized that when the structure 33 is at point D of FIGURE 4, the roller 81 is at point M of FIGURE 5. The points D and M may be considered as points of beginning for purposes of this description. The structure 33, as indicated in FIGURE 4 by the arrows, moves in a slightly arcuate path from D, upward and to the left toward point E.

Simultaneously, the roller 81 moves curvilinearly, as indicated by the arrows in FIGURE 5, from point M upward and to the right toward point N. When the bifurcated portion 33 is at point E, the roller 81 is at point N. Thereafter, the bifurcated portion 33 moves along the curvilinear trajectory from E, upward and toward the right, via point F, back to its point of beginning, point D. At the same time, the roller 81 moves practically horizontally from point N along the curvilinear trajectory to point P; thence downward and to the right to its point of beginning, point M.

When the structure 33 is at point D, its point of beginning, and the roller 81 is at point M, the following conditions exist with respect to the other apparatus shown on the drawing. By means of system 28, air is withdrawn from the feeder and a slight vacuum or negative pressure exists within the feeder arm 15. The belts 53, 55 move over the several rollers in the direction of the arrows A, B and C. The vacuum is maintained within the vacuum chamber 17, and air under slight pressure is being supplied to a separator nozzle (not shown) which is positioned to direct a stream of air against the top edges of the stack of checks 13. This stream of air causes the checks near the front to flutter to aid in removing only one check at a time from the stack.

In operation, a stack of checks 13 is placed on edge in a suitable tray 117 (indicated fragmentarily) which is suitably fixed on the base plate 11. The checks are disposed substantially parallel to the longitudinal axis of the feeder 15 and maintained in close-packed, on-edge arrangement. The front check 119, the one nearest the feeder, is maintained in a fixed spaced relation to the fingers 35 of the feeder 15.

When the fingers 35 are at point D, the perforations 37 thereof are in close proximity to the front face of the first check 119. The vacuum in the feeder urges the front check toward the fingers 35. The front check 119, therefore, is partially removed from the stack and is held against the openings 37 by atmospheric pressure acting on the back surface of the check 119. The fingers 35 now move along the trajectory from point D to point E. This trajectory portion is slightly curvilinear upward and toward the belt 53. As the fingers 35 approach point E, the left edge of the check 119 (as viewed in FIGURE 1) is directed for insertion between the rollers 81 and 57. It will be remembered that the fingers 35 straddle the arm 59 and roller 57.

When the fingers 35 reach point E, the tube 31 is withdrawn from the tube 29 such a distance that a plurality of passages 123 in the tube 31 are exposed to the atmosphere via similar passages in the fixed tube 29. Air enters the tube 31 and the vacuum in the feeder is broken. The check is released from the fingers, but immediately the roller 81 presses it against the belt 53. The roller 81 continues to move along its trajectory, from N toward P, and the shaft 39 moves the fingers 35 upward and away from the belt 53, along its arcuate trajectory, toward point D. The roller 81, meanwhile, keeps the check 119 in frictional contact with the belt 53. The check passes between a guide plate 121, which is provided opposite roller 51, and it enters the conveyor system between the rollers 47, 49. At this point of entry the check is arrested by the overlying belts 53, 55, whereupon it is whisked along the path of the conveyor system in the general direction of the arrow marked C, to another part of the machine. The roller 81 thereafter moves counterclockwise along its arcuate trajectory from P to M, its place of beginning.

It will be recognized that a feature of the invention is the simultaneous, synchronized movement of the fingers 35 of the feeder arm 15 and the idler roller 81, with respect to the conveyor system. The trajectory of the fingers 35 relative to the roller 81 is, of course, determined by the linkage mechanism connecting the rod 39 and the flywheel 89. The eccentricities of the shafts 69, 75 and the linkages 71, 73 determine the trajectory of the cam roller 81 relative to the fingers 35. It is important to note that the amount of eccentricity of the several shafts, the length of the links, and the relative location of the fixed pin 109 must be carefully selected to achieve the desired relative synchronous movement.

In the embodiment described herein, the distance between the axes of shafts 63 and 65 was about 1.5 inches. The distance from the axis of the shaft 65 to the axis of shaft 77 was about 1.5 inches. Stub shaft 69a was eccentric $1/16$ inch and stub shaft 75 was eccentric $1/8$ inch. With the foregoing dimensions, the axis of shaft 77 followed the trajectory illustrated in FIGURE 5 where the chord connecting points M and N was $1/8$ inch. It will be appreciated that a positive control on the approach of the idler to the check, as well as retraction, must be maintained in high-speed systems where documents are delivered at the rate of the order of twenty per second. A simple cam-driven device has been found inadequate for operation at such high speeds. A positive drive on both the arm 15 and the idler roller 81 is required. The system embodied in the present invention avoids chattering or recoil at any given position and, on the contrary, forces the arm repeatedly to follow the selected trajectory, as shown in FIGURE 4. The idler roller 81 likewise follows precisely the selected trajectory, as shown in FIGURE 5.

The vacuum in the feeder arm 31 should be slightly greater than the minimum required to continually and reliably remove one, and only one, check at a time. If the vacuum in the chamber 17 is too great, an excess check stopped by it will be difficult to remove by the feeder on a subsequent cycle. There is the possibility, also, that excessive vacuum in the chamber 17 may remove the single check from the fingers 35.

Thus, there is provided a document feeding mechanism comprising a feeder and a timing cam which cooperate effectively to remove a single check from a stack thereof, transport the same in a predetermined trajectory toward a document conveyor system, and feed the same into said conveyor system. The operations of removing, transporting and feeding the single document may effectively be accomplished by the mechanism of the present invention at a high rate of speed. The mechanism of the present invention performs such operations satisfactorily without damage to the document.

Having described the invention in connection with a preferred embodiment thereof, it is understood that further modifications may suggest themselves to those skilled in the art and it is intended to cover such modifications as fall within the scope of the appended claims.

What is claimed is:
1. The combination which comprises:
   (a) a document feeder arm mounted for oscillation about a first axis and including a tubular element reciprocably telescoped within said arm,
   (b) drive means for moving the end of said element along a first closed path having a linear section,
   (c) a roller mounted for movement in a second path forming a closed loop which is tangent to said linear section, and
   (d) timing means coupled to said drive means to move said roller in said second closed path.

2. The combination set forth in claim 1 in which said timing means moves said roller into tangency when said element leaves said linear section.

3. In a system for serially conveying documents from a stack thereof to the input of a conveyor system and including a pick-up arm for engaging each document in succession at the front of said stack and moving said document along a trajectory to bring said document into a confronting relationship with respect to a traveling transport element of said conveyor system, the combination therewith which comprises:
   (a) a roller positioned adjacent said transport element on the side of each document opposite said element,
   (b) a pivotal support for said roller,
   (c) a pair of spaced apart shafts for mounting said pivotal support for translational rotational movement, and
   (d) means for driving said spaced apart shafts eccentrically and in synchronism with said arm.

4. In a system for serially conveying documents from a stack thereof to the input of a conveyor system and including a pick-up arm for engaging each document in succession at the front of said stack and moving said document along a trajectory to bring said document into a confronting relationship with respect to a traveling transport element of said conveyor system, the combination therewith which comprises:
   (a) a roller positioned adjacent said transport element on the side of each document opposite said element,
   (b) a pivotal support for said roller,
   (c) a pair of spaced apart shafts each having eccentric portions for mounting said pivotal support, and
   (d) means for driving one of said spaced apart shafts in synchronism with said arm.

5. In a machine having a conveyor apparatus to receive and transport documents, a system for singly removing such documents from a stack thereof and for feeding the same into said conveyor apparatus which comprises:
   (a) a document feeder including a first tubular portion mounted for oscillation in a horizontal plane about a vertical axis, and including a second tubular portion reciprocable within said first portion and having a bifurcated pick-up thereon,
   (b) linkage means connected to said second tubular portion for moving said pick-up in a closed trajectory in the course of which said pick-up is in close proximity to said stack,
   (c) means for creating and maintaining a vacuum in said pick-up to grasp a document on each traverse of said trajectory,
   (d) means for breaking said vacuum as said pick-up moves each document to confront said conveyor apparatus,
   (e) a roller mounted for rotation about a vertical axis and for translation in said plane in a second closed trajectory, and
   (f) means for synchronously driving said feeder and said roller in their respective trajectories to move said roller into contact with said document at the same time said vacuum is broken to urge said document against said conveyor apparatus.

6. A system for removing documents one at a time from a stack thereof and for feeding the same into a document conveyor apparatus which comprises:
   (a) a first tubular element mounted for oscillation in a horizontal plane about a vertical axis,
   (b) a second tubular element mounted reciprocably in said first element and having a plurality of pick-up fingers for engaging each document,
   (c) drive means for said second tubular element to move said fingers in a first trajectory from adjacent said stack toward an entry point in said conveyor apparatus,
   (d) means for creating and maintaining a vacuum in the tubular elements to cause a single document to be pressed against said fingers,
   (e) means for breaking said vacuum as said fingers approach said entry point,
   (f) a roller positioned adjacent said conveyor apparatus on the side of said document opposite said fingers,
   (g) a pivotal support for said roller, and
   (h) means for moving said roller along a second trajectory into sustained contact with said document as said vacuum is broken and in synchronism with said fingers.

7. In a machine having conveying elements staggered at an entry point to receive and convey documents, a document feeding apparatus which comprises:
   (a) a roller mounted for rotation in close variable proximity to one of said elements in the region of said entry point,
   (b) means sequentially to transport single documents to said region and release the same thereat, and
   (c) positive drive means connected to said roller to translate said roller toward said one of said elements synchronously with the transporting means and to urge each of said documents at the release thereof into engagement with said one of said elements.

8. In a system for serially conveying documents from a stack thereof to the input of a conveyor system and including a pick-up arm for engaging documents successively at the front of said stack and moving them along a trajectory to bring each document into a confronting relationship with respect to a traveling transport element of said conveyor system, the combination therewith which comprises:
   (a) a roller positioned adjacent said transport element on the side of each document opposite said element,
   (b) a pivotal support for said roller,
   (c) a pair of rotatable spaced apart shafts mounted with fixed axial spacing in said system,
   (d) a first stub shaft mounted eccentrically on one of said shafts,
   (e) a second stub shaft mounted on the other said shaft and with eccentricity greater than the eccentricity of said first stub shaft,
   (f) linkage means interconnecting the eccentric shafts and said pivotal support for limiting movement of said pivotal support to a trajectory including a section substantially coinciding with the trajectory of said documents leaving said pick-up arm, and
   (g) means for rotating one of said spaced apart shafts in synchronism with said arm for engagement of said roller with each document moved into said trajectory by said arm.

9. In a system for serially conveying documents from a stack thereof to the input of a conveyor system and including a pick-up arm for engaging said documents in succession at the front of said stack and moving each document along a trajectory to bring it into a confronting relationship with respect to a traveling transport element of said conveyor system, the combination therewith which comprises:
   (a) a roller positioned adjacent said element on the side of each document moved to said relationship opposite said element,
   (b) a pivotal support for said roller,
   (c) a pair of rotatable spaced apart shafts,
   (d) a stub shaft mounted eccentrically on each of said shafts,
   (e) means including linkage means for connecting the eccentric shafts and said pivotal support for limiting movement of said pivotal support to a translational trajectory including a section in contact with said element, and
   (f) means for diving one of said spaced apart shafts in synchronism with said arm.

10. In a system for serially conveying documents from a stack thereof to the input of a conveyor system and including a pick-up arm for engaging documents successively at the front of said stack and moving them along a trajectory to bring each document into a confronting relationship with respect to a traveling transport element of said conveyor system, the combination therewith which comprises:
   (a) a roller positioned adjacent said transport element on the side of each document opposite said element,
   (b) a pivotal support for said roller,
   (c) a first eccentrically rotatable shaft,
   (d) a second eccentrically rotatable shaft spaced from said first shaft and having eccentricity greater than that of said first shaft,
   (e) linkage means interconnecting the eccentric shafts and said piovtal support for limiting movement of said pivotal support to a trajectory including a section substantially coinciding with the trajectory of said documents leaving said pick-up arm, and
   (f) means for driving one of said first shaft and said second shaft in synchronism with said arm for engagement of said roller with each document moved into said trajectory by said arm.

References Cited in the file of this patent
UNITED STATES PATENTS

| | | |
|---|---|---|
| 2,097,301 | Novick | Oct. 26, 1937 |
| 3,079,147 | Childs | Feb. 26, 1963 |